United States Patent [19]

Hettinga

[11] Patent Number: 5,773,038
[45] Date of Patent: Jun. 30, 1998

[54] APPARATUS FOR FAMILY MOLD SEQUENTIAL MOLDING

[76] Inventor: Siebolt Hettinga, 2123 NW. 111th St., Des Moines, Iowa 50325

[21] Appl. No.: 423,797

[22] Filed: Apr. 18, 1995

[51] Int. Cl.$^6$ .................................................. B29C 45/22
[52] U.S. Cl. .................. 425/145; 264/297.2; 264/328.8; 264/328.15; 425/549; 425/564; 425/572
[58] Field of Search ................................. 425/145, 549, 425/562, 564, 572, 589, 588; 264/328.15, 297.8, 328.8, 297.2

[56] References Cited

U.S. PATENT DOCUMENTS

| | | | |
|---|---|---|---|
| 3,417,433 | 12/1968 | Teraoka ................................... | 425/588 |
| 5,043,129 | 8/1991 | Sorensen . | |
| 5,049,343 | 9/1991 | Sorensen . | |
| 5,052,915 | 10/1991 | Schad et al. ............................ | 425/589 |
| 5,078,589 | 1/1992 | Osuna-Diaz . | |
| 5,149,547 | 9/1992 | Gill . | |
| 5,223,275 | 6/1993 | Gellert . | |
| 5,256,048 | 10/1993 | Jacobs et al. . | |
| 5,260,012 | 11/1993 | Arnott . | |
| 5,275,778 | 1/1994 | VonHoldt, Sr. . | |
| 5,348,461 | 9/1994 | Nishida et al. . | |

*Primary Examiner*—Tim Heitbrink
*Attorney, Agent, or Firm*—Brian J. Laurenzo; Kent A. Herink; Michael C. Gilchrist

[57] ABSTRACT

An apparatus and method for sequentially molding a plurality of plastic articles within a single mold unit. A first mold section is provided with a runner system and a plurality of gates and a second mold section is provided with a plurality of recesses in operable alignment with the gates of the first mold section. When the second mold section is clamped into mating engagement with the first mold section, a plurality of discrete mold cavities are formed, each having at least one corresponding gate provided on the first mold section. A central processing unit signals an injection assembly as to the proper injection parameters for each discrete mold cavity. The central processing unit opens the gates sequentially, with each discrete mold cavity being filled according to its own set of injection parameters. By the present method, it is possible to mold a plurality of articles having different injection parameters, while using a single mold unit. The present method also makes it possible to mold the small articles without having to overfill the mold cavity, which could result in defective products or damage to the mold unit. Because the present method can be used to mold a plurality of small sets of small articles, more precision can be obtained than with the prior art method of filling one large set of small articles.

15 Claims, 7 Drawing Sheets

APPARATUS FOR FAMILY MOLD SEQUENTIAL MOLDING

BACKGROUND OF THE INVENTION

This invention relates to a molding apparatus and method for molding a plurality of plastic articles within a single mold unit and, more particularly, to a molding apparatus and method for sequentially molding individual mold cavities of a single mold unit to allow greater precision and a larger variety of parts to be molded.

Injection molding machines generally include a two-section mold unit wherein one of the mold sections is stationary and the other mold section is generally moveable between an open position away from the stationary mold section and a closed position wherein the two mold sections are sealed in contact engagement. The stationary mold section generally includes an opening for the injection of a mold material while the moveable mold section is provided with a recess which forms a mold cavity when the mold sections are sealed in contact engagement. A mold material is injected into the mold cavity under high pressure, the mold material is allowed to harden, and the moveable mold section is moved away from the stationary mold section to release the finished molded part.

Due to the expense of mold units, along with the cure time required for a plastic article to remain within the mold unit as it hardens, it is not feasible to mold very small parts, such as bottle caps, one at a time. Instead, for small parts, the moveable mold section is generally provided with a plurality of recesses inner-connected by a series of thin runners which allow overflow material from a single recess to pass through the runner system into as yet unfilled recesses. This multi-recess method allows a large number of small parts to be molded simultaneously, thereby reducing the cost of providing a plurality of mold units for each individual and significantly decreasing the per item molding time, since all of the parts are hardening simultaneously.

One notable drawback of the prior art method of simultaneously molding a large number of small parts is the inability to accurately fill each recess. Typically, the large number of recesses provided makes it nearly impossible to accurately gauge the precise amount of material needed to fill each recess to the proper volume at the same time. Accordingly, an excess of material is "packed" into the recesses to assure that each recess is provided with enough material. While packing allows each recess to receive at least enough material to fill the recess, the packing not only wastes material, but may lead to warped or deformed products due to pressure gradients molded into the parts during the packing stage of the injection process. Additionally, packing may lead to damage of the mold sections if excess material begins to leak out along the parting line between the moveable mold section and the non-moveable mold section. As this "flash" hardens, the clamping apparatus presses the mold sections together against the hardened plastic, leading to premature wear on the mold sections at the point where the hardened plastic is being compressed.

While it would be desirable to reduce the number of recesses to allow more accurate control of the filling process, a reduction in the number of recesses has heretofore required the use of several additional molding stations. These additional molding stations would be required to make up for the decreased output of the fewer recesses. Prior art molding techniques have required this trade-off between accurate filling and the added cost of multiple mold units.

Along with the desirability of accurate filling, is the desirability of molding various parts having different molding requirements within a single mold unit. Heretofore, since mold units are generally supplied with a single injector and runner system, it has not been possible to change the molding parameters between parts being molded in a multi-cavity mold unit. Typically, all parts within a mold unit are molded under identical parameters, generally necessitating that the parts themselves be identical. To mold different parts, with different molding parameters, two separate mold units have heretofore been required to allow for fine-tuned control of molding parameters between parts. The difficulties encountered in the prior art discussed hereinabove are substantially eliminated by the present invention.

SUMMARY OF THE INVENTION

Accordingly, it is an object of the present invention to provide an apparatus for molding a plurality of different parts within a single mold unit.

Another object of the present invention is to provide an apparatus which reduces flash when molding a plurality of small parts.

A further object of the present invention is to provide a method for allowing greater precision in filling a mold cavity with a flowable plastic material.

Still another object of the present invention is to provide a method for allowing manipulation of injection pressure of a flowable plastic material between different mold cavities of a single mold unit.

Yet another object of the present invention is to provide a method for manipulation of injection parameters between different mold cavities of a single mold unit.

These, and other objects of the invention, will become apparent upon reference to the following specification, drawings, and claims.

By the present invention it is proposed to overcome the difficulties encountered heretofore. To this end, a plastic injection molding apparatus is provided for sequentially molding a plurality of plastic articles. The plastic injection molding apparatus is provided with a first mold section having a runner system connecting an inlet to a first outlet and a second outlet. Opposite to and in mating alignment with the first mold section, is a second mold section. The second mold section is provided with a first recess in mating alignment with the first outlet and a second recess in mating alignment with the second outlet. Means are also provided for clamping the first mold section into mating alignment with the second mold section to form a discrete first mold cavity with the first recess and a discrete second mold cavity with the second recess. A first and second gate are operably coupled to the runner system to regulate flow of the plastic material through the first and second outlets respectively. The plastic injection molding apparatus is provided with means for clamping the second mold section into mating engagement with the first mold section to form the first discrete mold cavity and the second discrete mold cavity. Means are also provided for injecting a flowable plastic material into the inlet as is means for sequentially actuating the first gate and the second gate to allow the flowable plastic material to sequentially pass from the inlet through the runner system into the first mold cavity and the second mold cavity.

Preferably, in the method of the present invention, the first gate is opened while the second gate is closed, and the first gate remains open until the first cavity is filled. The first gate is then closed and the second gate is opened until the second mold cavity is properly filled. Because the mold cavities are filled separately, they may be filled with wholly independent molding parameters to accommodate special molding needs if the mold cavities are designed for molding different articles.

DETAILED DESCRIPTION OF THE INVENTION

There is shown in the figures a plastic injection assembly 10 having an injection apparatus 34 and a mold unit 12. The mold unit 12 has a first mold section 14 provided with a sprue 40, a runner 42 and four outlets, 62, 64, 66, and 68. The outlets 62, 64, 66, and 68 are opposite to and in alignment with a plurality of recesses 80, 82, 88, 90, and 98 provided in the second mold section 16. A central processing unit 70 controls the injection of a plastic material 36 into the recesses 80, 82, 88, 90, and 98 via gates 46, 48, 50, and 52. Since the gates 46, 48, 50, and 52 are sequentially opened, the injection parameters between the recesses 80, 82, 88, 90, and 98 may be customized for the particular part being molded in each recess. This sequential actuation allows different parts to be molded in each recess and allows a large number of small parts to be molded without overpacking the recesses 80, 82, 88, 90, and 98.

Figure 1:
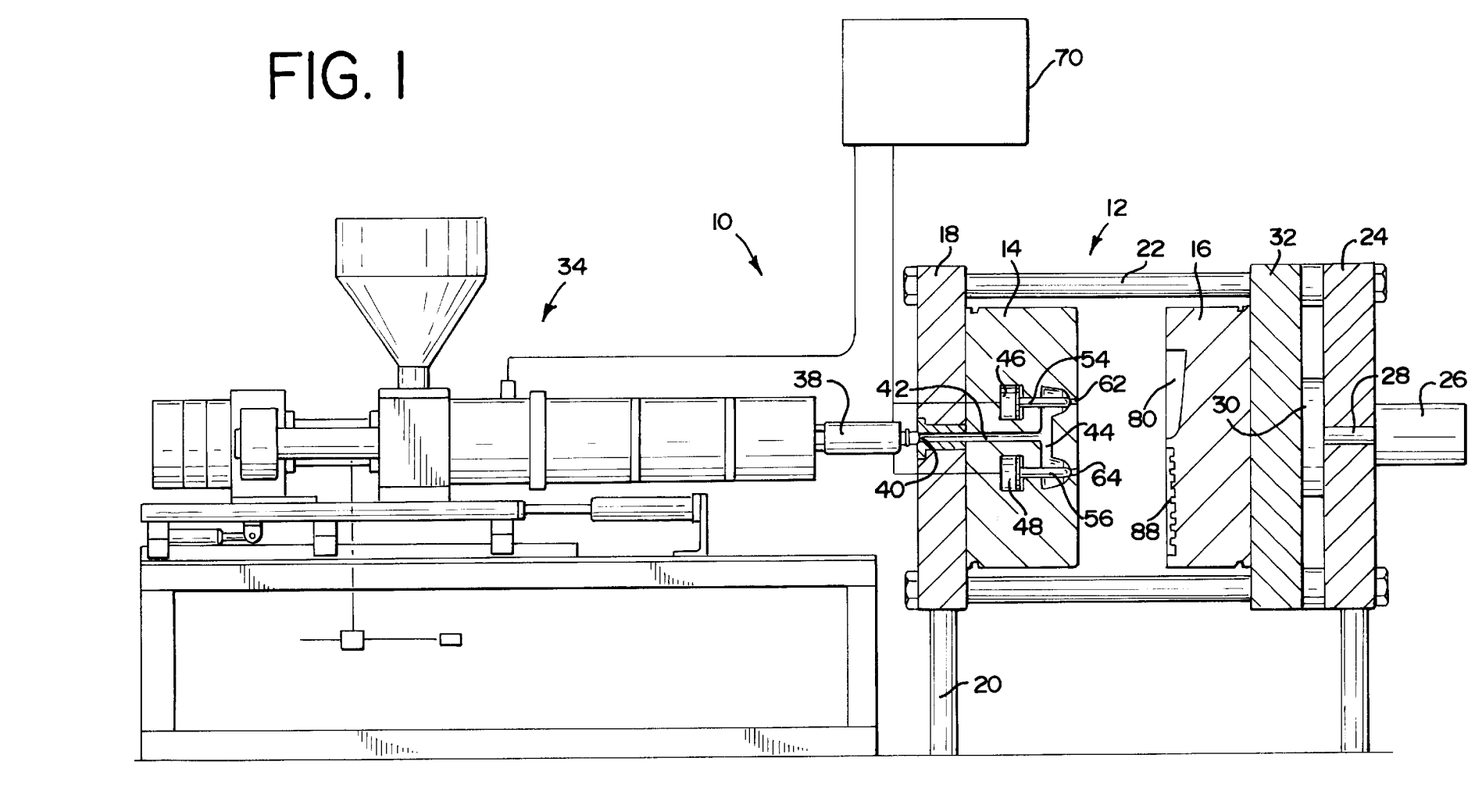
FIG. 1 is a side elevation in partial cross-section showing the plastic injection molding apparatus of the present invention in the open position.

In FIG. 1, there is shown a plastic injection assembly 10 having a mold unit 12. The mold unit 12 has a first mold section 14 and a second mold section 16. The first mold section 14 is secured to a base plate 18 which, in turn, is secured to a support frame 20. Passing through and secured to the base plate 18 are four tie bars 22 (only two shown) which are secured on their opposite ends to a push plate 24.

Secured to the push plate 24 is a hydraulic cylinder 26 having a ram 28. The ram 28 is secured to a platen 30 to evenly disburse the force of the hydraulic cylinder 26 across a moveable carriage 32. The moveable carriage 32 is slidably coupled to the tie bars 22 by bores provided in the corners of the carriage 32. The second mold section 16 is secured to the carriage 32 which allows the second mold section 16 to move into and out of mating engagement with the first mold section 14.

Figure 4:
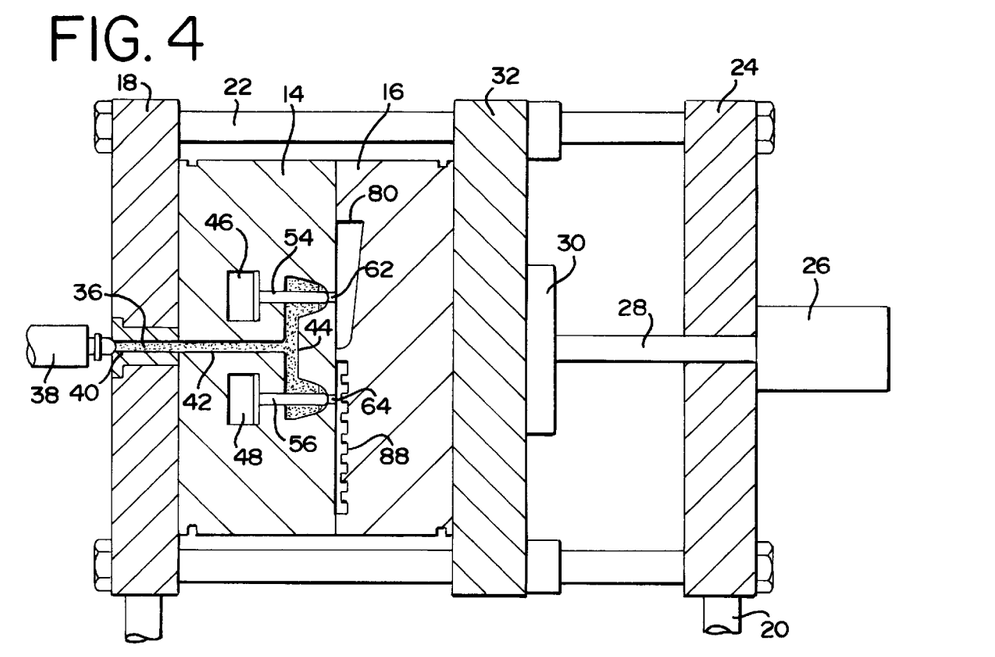
FIG. 4 is a side elevation in partial cross-section of the mold unit of FIG. 1 shown with the runner system filled with a flowable plastic material.
Figure 8:
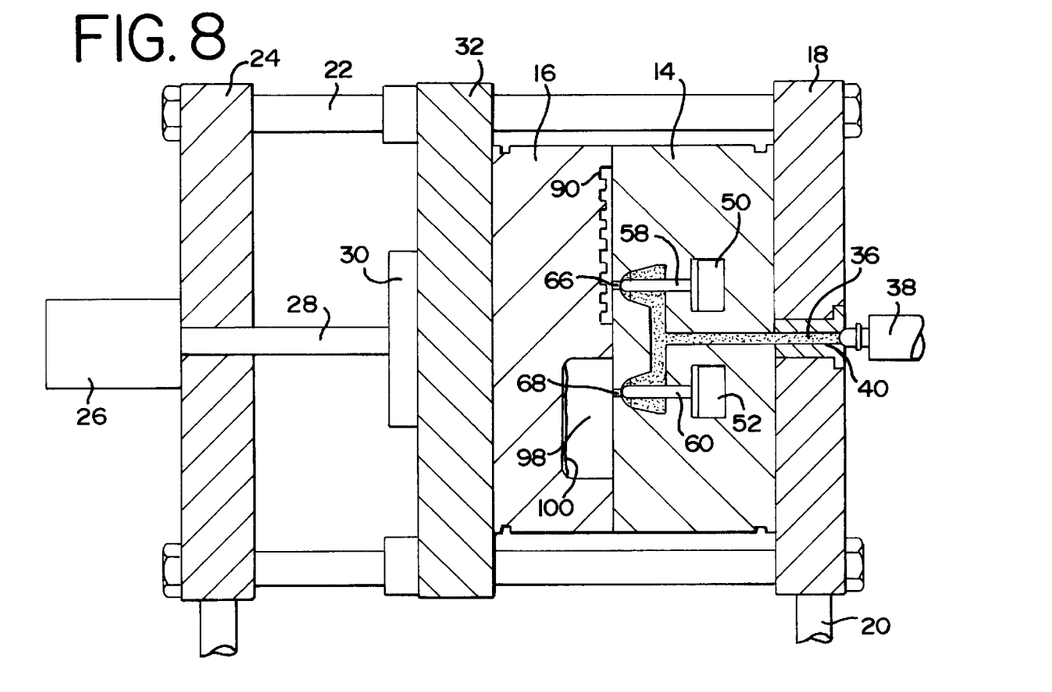
FIG. 8 is a side elevation in partial cross-section showing the mold of FIG. 1 with the third and the fourth gates closed.

A plastic injection apparatus 34 is provided to process and inject a flowable plastic material 36 into the mold unit 12 (FIGS. 1 and 4). The flowable plastic material 36 is injected into the mold unit 12 through an injection nozzle 38 secured to the injection apparatus 34. The injection nozzle 38 fits into mated engagement with a sprue 40 provided in the base plate 18. The sprue 40 connects the injection nozzle 38 with a runner 42 and cross runner 44 provided in the first mold section 14. As can be seen in FIGS. 4 and 8, the runner system is connected to four hydraulically actuated gates 46, 48, 50, and 52. Each gate 46, 48, 50, and 52 is provided with a piston 54, 56, 58, and 60 which closes off a respective outlet 62, 64, 66, and 68. The gates 46, 48, 50, and 52 are coupled to a central processing unit 70 which is also coupled to the injection apparatus 34 (FIGS. 1 and 8).

Figure 3:
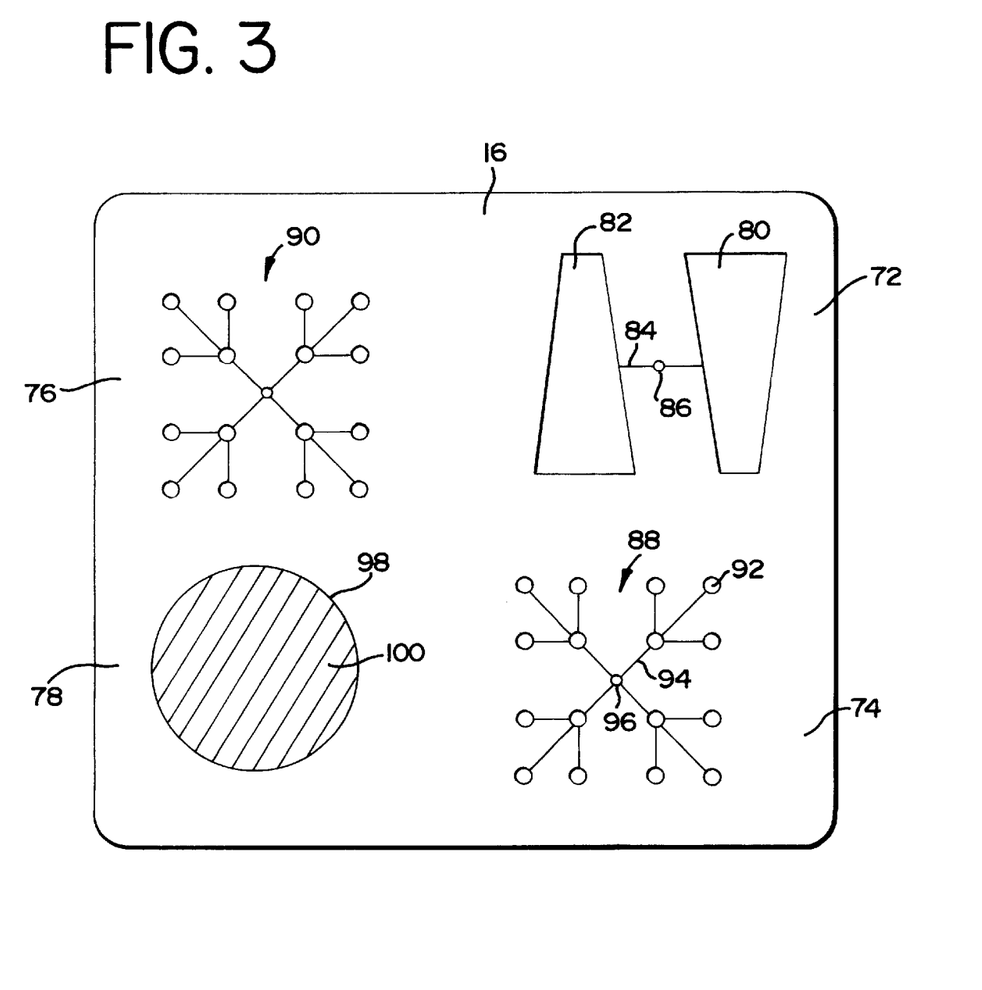
FIG. 3 is a front elevation of the moveable mold section of FIG. 1 showing the four discrete mold cavities provided in the moveable mold section.

As shown in FIG. 3, the second mold section 16 is divided into four quadrants 72, 74, 76, and 78. Each quadrant is positioned in mating alignment with one of the four outlets 62, 64, 66, and 68 of the first mold section 14 (FIGS. 3, 4, and 8). Each quadrant is provided with a discrete recess or plurality of recesses. That is, while the recesses within a single quadrant 72, 74, 76, and 78 may be interconnected to one another by runners to allow even distribution of injection material within the quadrant, the recesses are discrete inasmuch as no means are provided for allowing distribution of an injection material back and forth between recesses in different quadrants. While it is not imperative that there be four discrete sets of recesses or that any recesses be interconnected by runners to allow even distribution of material, it is important that there be at least two discrete recesses or sets of recesses to allow a plurality of articles to be molded, or to allow different injection parameters to be used between articles.

As shown in FIG. 3, the first quadrant 72 is provided with two frustopyramidal recesses 80 and 82 interconnected by a runner 84 and an inlet 86. The second quadrant 74 and third quadrant 76 of the second mold section 16 are provided with two sets 88 and 90 of small circular recesses 92 for the molding of bottle caps or similar small items. The recesses 92 are interconnected by runners 94 which radiate outward from inlets 96. Preferably, the number of small circular recesses 92 is limited by the number which can be adequately filled without overpacking the recesses 92. The fourth quadrant 78 of the second mold section 16 is provided with a large circular recess 98 into which has been placed a fabric 100. The fabric 100 may be of any type which is desired to be molded integral with a circular molded plastic article.

Before the injection material is injected into the mold cavity, it is first plasticized to provide a flowable material which eventually hardens into a finished plastic article. The following parameters affect the plasticization process: the type of raw plastic material to be plasticized; throat temperature; the temperature of injector heating zones; the size, length and type of screw; the rate at which the screw is turned; and the rate at which the screw is allowed to move back. Of these parameters, only the type of raw plastic material and screw dimensions are not directly controlled by software within the CPU. The throat temperature and temperature of injector heating zones are controlled by standard proportion integral derivative (PID) control algorithms. The software controls the rate at which the screw is turned so that the rate is directly proportional to the rate of oil produced by a variable vane hydraulic pump. The software directly controls the rate at which the oil is delivered by the variable vane pump by supplying two set points, a rate set point and a maximum pressure set point. The rate set point specifies the rate of oil flow requested while the maximum pressure set point specifies a maximum pressure limit. Consequently, since pressure is a function of rate of flow times a resistance, the maximum pressure set point will limit the rate of flow in the case when maximum pressure is obtained. Preferably, the rate at which the screw turns during the plasticization process is profiled. Profiling causes the screw to turn at different rates during the plasticized cycle. Software is written to specify the particular profile by supplying the required rate and the maximum pressure set points to the variable vane pump supplying a profile to flow of oil to the screw.

The rate at which the screw is allowed to move back is also controlled by software. The profiled turning of the screw during the plasticization process causes the plastic material to be metered to an area in front of the screw. The plastic material being metered forward causes a counter plastic pressure attempting to force the screw backward. The rate at which the screw moves backward, from the counter pressure of the plastic material being metered forward, is profiled by software. Profiling of the rate of movement backward allows for variations in the amount of time the plastic material is mixed by the screw, as well as profiling the amount of frictional heat created by the screw turning which in turn is induced into the plastic material. Software specifies this profile by supplying a back pressure set point to a variable hydraulic back pressure valve.

Like the plasticization process, the injection process is also controlled by software. The parameters associated with the injection process include the following: the type of raw plastic material to be injected; the temperature of the plastic material; the size, length and type of screw; the rate at which the plastic material is injected; the mold design; and the mold temperature. Preferably, both the temperature of the material and the rate at which the plastic material is injected are controlled by software. To control the temperature of material as the material enters the mold cavity during injection, software controls several parameters. The heater bin temperature is manipulated during the plasticization process and frictional heat is controlled during both the plasticization and back pressure cycles. Additionally, frictional heat developed from the plastic material moving through the injection nozzle during the injection process is controlled to provide the optimum amount of heat into the material based upon the desired resulting plastic product.

Software allows the rate at which the plastic material is injected during the inject cycle to be profiled. Profiling causes the material to be injected at different rates during the inject cycle. Software specifies this profile by supplying the required rate and maximum pressure set points to the variable vane pump supplying a profile to flow of oil to the cylinders attached to the screw. A typical inject profile will begin at a slow inject rate with the pump set to allow for maximum pressure. As the mold cavity fills, the rate proportionally increases to the optimum rate for the filling of the mold cavity. When the mold cavity is ninety percent (90%) filled, the maximum pressure set point of the hydraulic pump is lowered to a value which prevents the injection pressure from overcoming the clamp pressure. The remainder of the material is injected into the mold cavity allowing the pressure compensation characteristics of the pump to control the rate at which the material is injected. This type of profiling describes a manner in which the tool is ninety percent (90%) filled using rate control with the last ten percent (10%) using pressure control. This is accomplished by the design of the hydraulic system and control software.

Preferably, the gating system of the present invention is also controlled by software. The following properties affect the gating system of the present invention: the physical design of the hot runner system attached to the gates; the temperature of the hot runner system; the physical design of the gates attached to the mold sections or the mold cavity; the temperature of the gates; and the opening and closing of the gates.

The temperature of the hot runner system and the temperature of the gates are controlled by standard PID control algorithms. The opening and closing of the gates are programmed to open alternatively, at the beginning of each injection cycle, based on the amount of material injected into each mold cavity, or based on a unit of time after each injection cycle is started. Similarly, a valve gate can be programmed to close either at the end of each injection cycle, based on the amount of material injected into each mold cavity, or based on a unit of time after each injection cycle has started. In the preferred embodiment of the present invention, a gate is opened and closed based upon the volume of material injected into the mold cavity rather than estimating the volume based upon a time/injection profile estimation of the volume.

Figure 2:
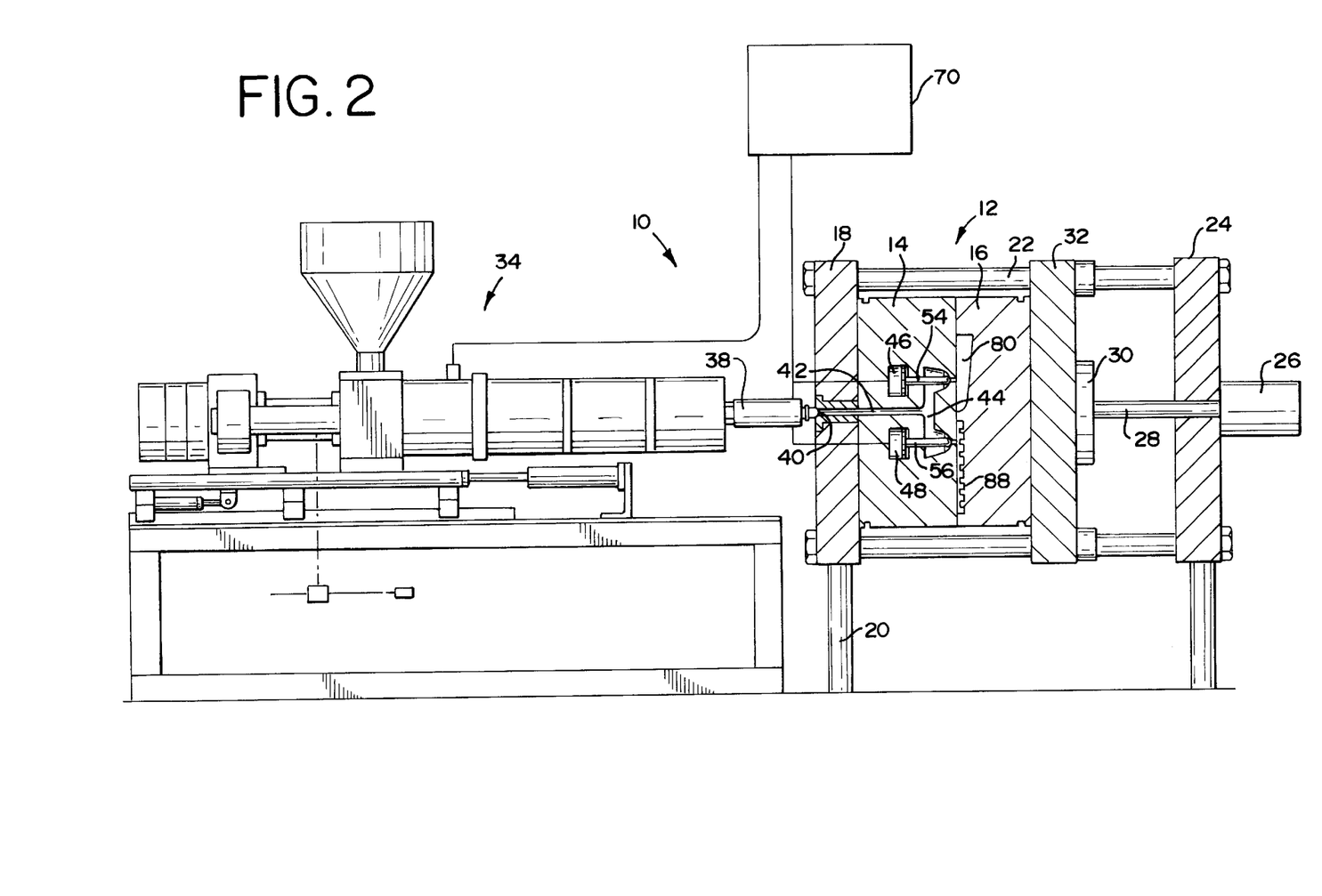
FIG. 2 is a side elevation in partial cross-section showing the plastic injection molding apparatus of FIG. 1 in the closed position.
Figure 5:
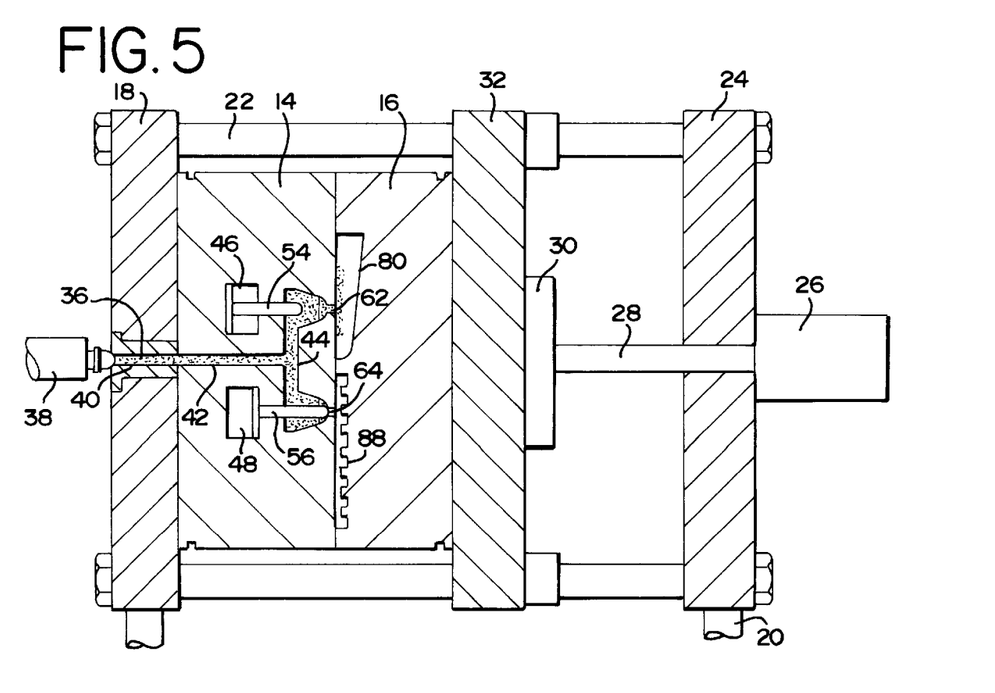
FIG. 5 is a side elevation in partial cross-section of the mold of FIG. 1 showing the first gate opened and the flowable plastic material moving into the first mold cavity.
Figure 6:
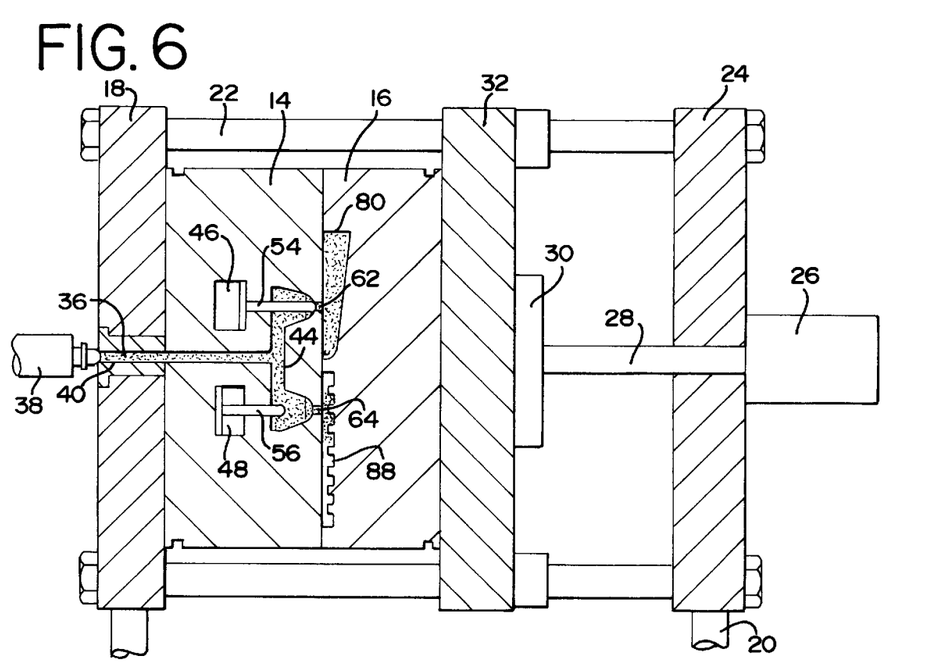
FIG. 6 is a side elevation in partial cross-section of the mold unit of FIG. 1 showing the first mold cavity filled, the first gate closed, the second gate opened, and the flowable plastic material moving into the second mold cavity.

To begin the molding process, the hydraulic cylinder 26 is actuated to move the second mold section 16 into mating engagement with the first mold section 14 (FIGS. 1–2). The injection nozzle 38 is moved into engagement with the sprue 40 and the plastic injection material 36 is forced through the sprue 40, runner 42, and cross runner 44 as shown in FIG. 4. Once the plastic material 36 has filled the runner 42 and cross runner 44, the first gate 46 is actuated by the central processing unit 70 to move the piston 54 out of engagement with the outlet 62 (FIGS. 1 and 4). Once the gate 46 has been actuated, the injection apparatus 34 forces the plastic material 36 into the frustopyramidal recesses 80 and 82 through the inlet 86 and runner 84 under a first set of injection parameters (FIGS. 1, 3, and 5). Preferably, the injection parameters are designed for the mold flow characteristics of the frustopyramidal recesses 80 and 82. As shown in FIG. 6, once the frustopyramidal recesses 80 and 82 have been filled, the central processing unit 70 signals the associated gate 46 to close, thereby causing the pin 54 to seal off the outlet 62 and stop the flow of the plastic material 36 into the frustopyramidal recesses 80 and 82 (FIGS. 1, 3, and 5).

After the first gate 46 has been shut off, the central processing unit 70 signals the second gate 48 to open, thereby moving the pin 56 out of engagement with the outlet 64 (FIGS. 1 and 6). The plastic material 36 is thereby allowed to flow through the outlet 64 and through the inlet 96 to the small circular recesses 92 via the runners 94 (FIGS. 3 and 6). Since the first set 88 of small circular recesses 92 is substantially different than the frustopyramidal recesses 80 and 82, the mold flow characteristics and therefore the injection parameters must be accordingly adjusted to properly fill the first set 88 of small circular recesses 92.

In the present invention, the apparatus 10 is only simultaneously filling sixteen of the small circular recesses 92 at a time (FIGS. 1 and 3). This contrasts with prior art methods which would involve filling sixty-four or more small recesses simultaneously. In the present application, it is desirable to attempt to simultaneously fill no more recesses than may be reliably and repeatedly filled to the proper volume. The present invention seeks to avoid prior art situations where there exists such a plurality of recesses, that it is impossible to simultaneously and identically fill each recess exactly to its allotted volume. Whereas the prior art processes merely overpack an excess of flowable material into the recesses in an attempt to completely fill the recesses, the present invention reduces the number of recesses 92 to a smaller, more manageable number. The smaller number of recesses 92 eliminates the need for overpacking to achieve an appropriate fill volume.

Figure 7:
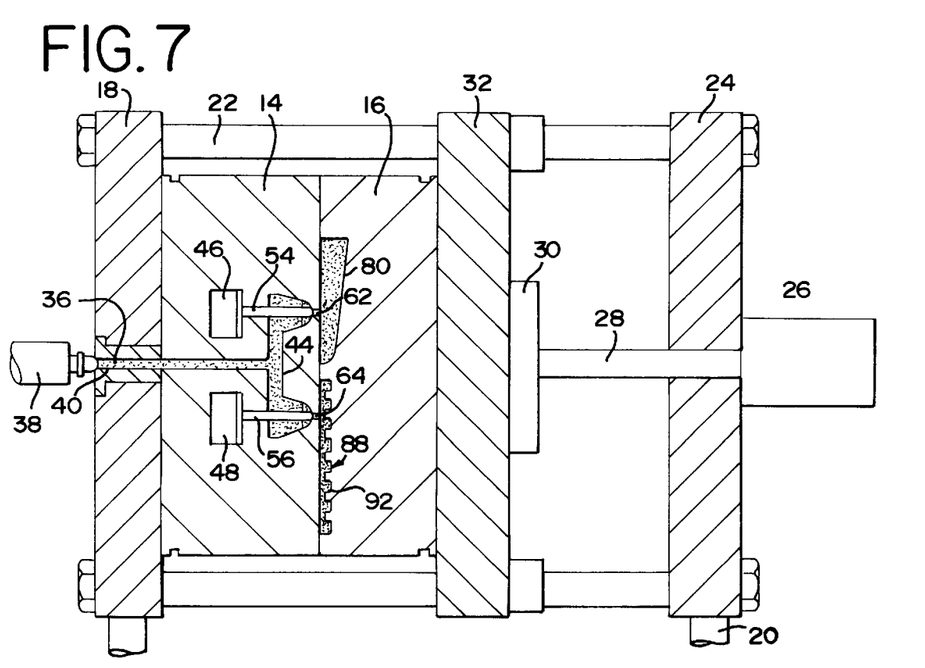
FIG. 7 is a side elevation in partial cross-section of the mold of FIG. 1 showing both the first and the second gates closed and the first and second mold cavities filled.
Figure 9:
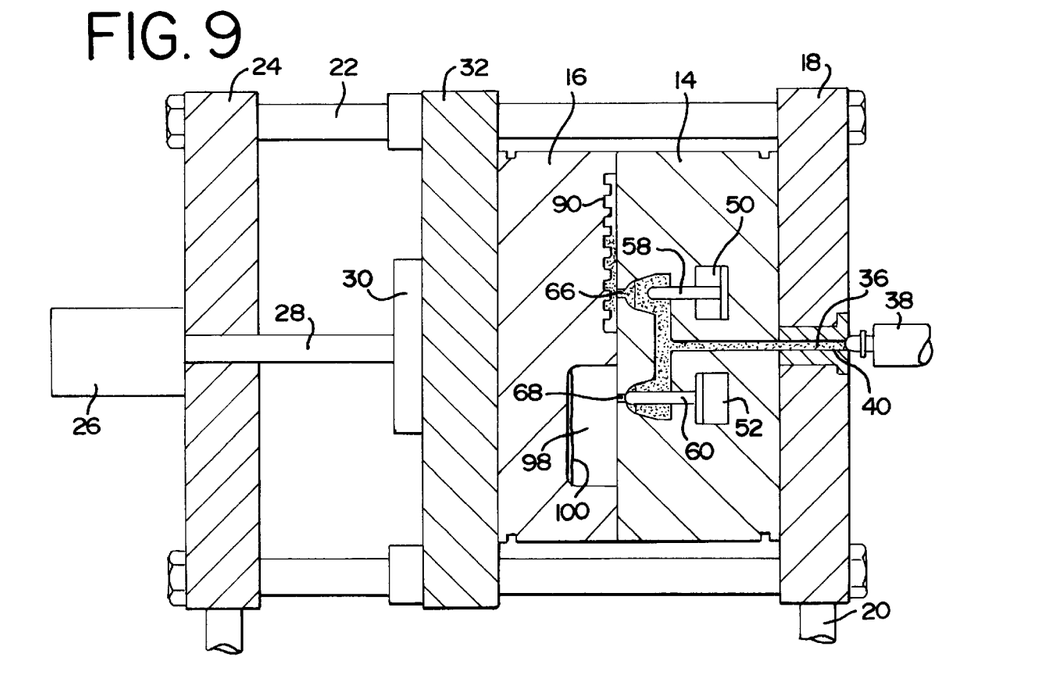
FIG. 9 is a side elevation in partial cross-section showing the mold of FIG. 1 with the third gate opened and the flowable plastic material moving into the third mold cavity.

As shown in FIG. 7, once the first set 88 of small circular recesses 92 has been filled, the central processing unit 70 signals the second gate 48 to close off the outlet 64 (FIGS. 1 and 7). Once the second outlet 64 has been closed off, the central processing unit 70 actuates the third gate 50 to move the piston 58 out of contact with the outlet 66 (FIGS. 1, 7 and 9). Just as the first set 88 of small circular recesses 92 is properly and efficiently filled by reducing the number of recesses over the prior art, so too is the second set 90 of small circular recesses 92 (FIG. 3).

Figure 10:
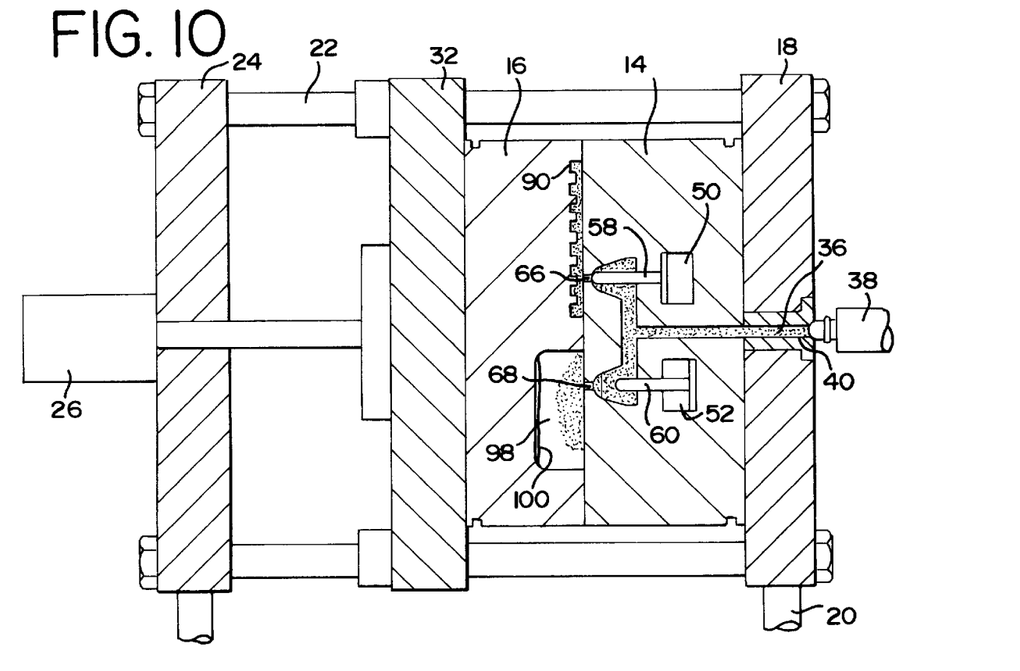
FIG. 10 is a side elevation in partial cross-section showing the mold of FIG. 1 with the third mold cavity filled, the third gate closed, the fourth gate open, and the flowable plastic material moving into the fourth mold cavity.
Figure 11:
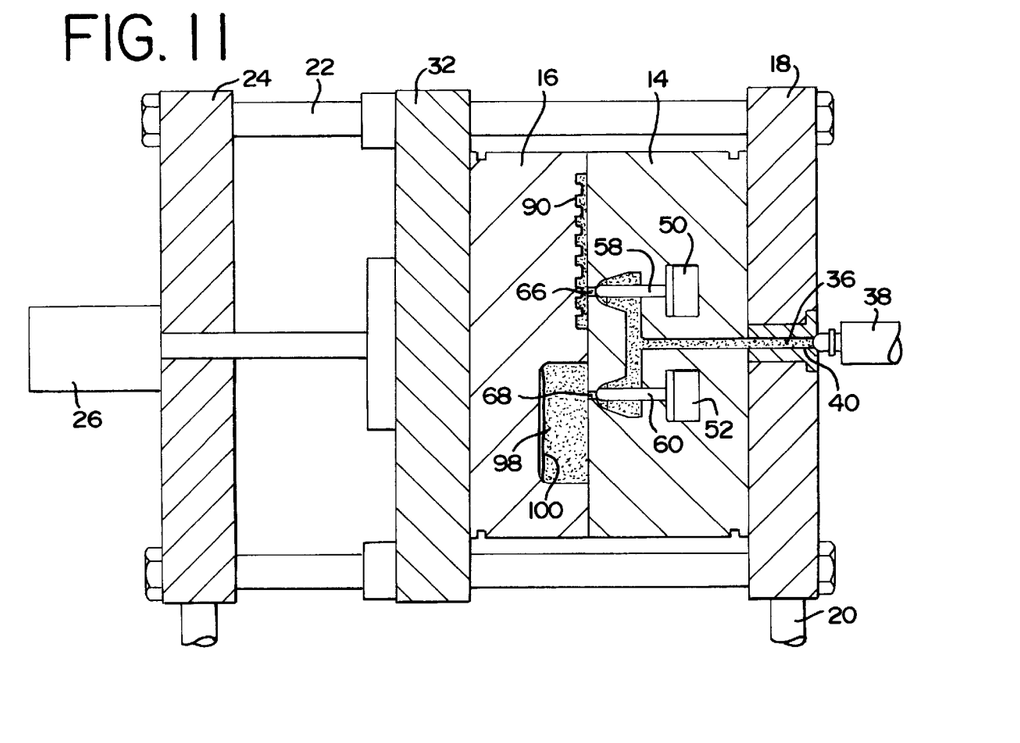
FIG. 11 is a side elevation in partial cross-section showing the mold unit of FIG. 1 with the third and the fourth gates closed and the third and the fourth mold cavities filled.

Once the second set 90 of small circular recesses 92 has been adequately filled, the central processing unit 70 actuates the third gate 50 to close, and, as shown in FIG. 10, the fourth gate 52 is actuated to move the pin 60 out of the outlet 68 so that the plastic material 36 is allowed to flow into the circular recess 98 and onto the fabric inlay 100 (FIGS. 1, 3 and 10). Due to the large volume of the circular recess 98 and the use of a fabric inlay 100, the injection parameters at which the plastic material 36 is injected into the circular recess 98 are appropriately calculated and assimilated by the central processing unit 70 which signals the injection assembly 34 to inject the plastic material 36 based upon those parameters. Once the circular recess 98 is filled, the central processing unit 70 closes the fourth gate 52 thereby stemming the flow of plastic material 36 into the mold unit 12 (FIGS. 1 and 11). After the plastic material 36 has adequately cooled within the mold unit 12, the hydraulic cylinder 26 is actuated to move the second mold section 16 away from the first mold section 14 so that the finished plastic articles may be removed.

An anticipated alternative embodiment of the present invention is where a pair of gates are connected to a single recess. While a plurality of gates is not necessary under most molding conditions, there is a particular advantage in certain situations to using a plurality of gates. When molding a large plastic part, using a plurality of gates allows the recess to be filled more quickly using a lower pressure than if a single gate were used. Preferably, a CPU is operably coupled to the gates so that the gates open sequentially to fill the recess. As the plastic material enters a runner and a cross-runner, the CPU triggers the first gate to open and allow the plastic material to enter the mold cavity. The CPU monitors an injection assembly to determine when a sufficient volume of plastic material has entered the recess so that the plastic material covers an outlet provided on the second gate. Once the outlet has been covered with plastic material, the CPU closes the first gate and opens the second gate to complete the filling of the recess with plastic material. By opening the second gate only after the outlet has been covered with plastic material, knit lines, which weaken and detract from the aesthetics of a finished plastic article, are eliminated. It should be noted, of course, that any number of gates, orientations, and sequential openings may be used to comport with the mold flow characteristics of a particular recess.

The foregoing description and drawings merely explain and illustrate the invention and the invention is not limited thereto, except in so far as the claims are so limited, as those skilled in the art who have the disclosure before them will be able to make modifications and variations therein without departing from the scope of the invention. For example, it is anticipated that any suitable number and placement of recesses or sets of recesses may be provided in the mold unit 12 depending upon the desired finished plastic articles.

What is claimed is:

1. A plastic injection molding apparatus for sequentially molding a plurality of plastic articles, said plastic injection molding apparatus comprising:
   (a) a first mold section provided with a runner system connecting an inlet to a first outlet and a second outlet;
   (b) a second mold section opposite to and in mating alignment with said first mold section, said second mold section being provided with a first recess in mating alignment with said first outlet and forming a first discrete mold cavity when said second mold section is clamped into mating engagement with said first mold section, said second mold section being provided with a second recess in mating alignment with said second outlet and forming a second discrete mold cavity when said second mold section is clamped into mating engagement with said first mold section;
   (c) a first gate operably coupled to said runner system in a manner which allows said first gate to regulate flow of a flowable plastic material through said first outlet;
   (d) a second gate operably coupled to said runner system in a manner which allows said second gate to regulate flow of said flowable plastic material through said second outlet;
   (e) means for clamping said second mold section into mating engagement with said first mold section to form said first discrete mold cavity with said first recess and said second discrete mold cavity with said second recess;
   (f) first means for opening and closing said first gate;
   (g) second means for opening and closing said second gate after opening and closing said first gate;
   (h) means for injecting said flowable plastic material through said first outlet at a first pressure and rate; and
   (i) means for injecting said flowable plastic material through said second outlet at a second pressure and rate, wherein said second pressure and rate is different from said first pressure and rate.

2. The plastic injection molding apparatus of claim 1, further comprising:
   (a) means for injecting said flowable plastic material through said first outlet at a first pressure and rate; and
   (b) means for injecting said flowable plastic material through said second outlet at a second pressure and rate, wherein said second pressure and rate is the same as said first pressure and rate.

3. The plastic injection molding apparatus of claim 1, wherein said first means for opening and closing said first gate is coupled to a central processing unit, and wherein said second means for opening and closing said second gate is coupled to said central processing unit.

4. The plastic injection molding apparatus of claim 1, wherein said clamping means is a hydraulic cylinder.

5. The plastic injection molding apparatus of claim 1, wherein said first mold cavity is of a different dimension than said second mold cavity.

6. The plastic injection molding apparatus of claim 1, wherein said runner system also connects said inlet to a third outlet and further comprising a third gate connected to said runner system between said inlet and said third outlet.

7. The plastic injection molding apparatus of claim 6, wherein said second mold section is provided with a third recess in mating alignment with said third outlet, wherein a third mold cavity is formed when said second mold section is clamped into mating engagement with said first mold section, wherein said third gate is operably coupled to said runner system in a manner which allows said third gate to regulate the flow of said plastic material through said third outlet, and wherein said plastic injection molding apparatus further comprises third means for opening and closing said third gate after opening and closing said second gate.

8. The plastic injection molding apparatus of claim 1, further comprising means for monitoring a volume of said flowable plastic material as said flowable plastic material passes through said inlet.

9. The plastic injection molding apparatus of claim 1, wherein said runner system connects said inlet to a third outlet in mating alignment with a third recess formed in said second mold section, said third recess forming a third mold cavity when said second mold section is clamped into mating alignment with said first mold section, and further comprising:

(a) means for simultaneously filling said first mold cavity and said third mold cavity with said flowable plastic material; and (b) means for preventing said flowable plastic material from entering said second mold cavity as said first mold cavity and said third mold cavity are being filled.

10. A plastic injection molding apparatus for sequentially molding a plurality of plastic articles, said plastic injection molding apparatus comprising:

(a) a first mold section provided with a runner system connecting an inlet to a first outlet and a second outlet;

(b) a second mold section opposite to and in mating alignment with said first mold section, said second mold section being provided with a first recess in mating alignment with said first outlet and forming a first discrete mold cavity when said second mold section is clamped into mating engagement with said first mold section, said second mold section being provided with a second recess in mating alignment with said second outlet and forming a second discrete mold cavity when said second mold section is clamped into mating engagement with said first mold section, wherein said second recess is of different dimensions than said first recess;

(c) a first gate operably coupled to said runner system in a manner which allows said first gate to regulate flow of a flowable plastic material through said first outlet;

(d) a second gate operably coupled to said runner system in a manner which allows said second gate to regulate flow of said flowable plastic material through said second outlet;

(e) means for clamping said second mold section into mating engagement with said first mold section to form said first discrete mold cavity with said first recess and said second discrete mold cavity with said second recess;

(f) means for injecting said flowable plastic material through said first outlet at a first pressure and rate;

(g) first means for preventing said flowable plastic material from injecting through said second outlet until said first discreet mold cavity is substantially filled;

(h) means for injecting said flowable plastic material through said second outlet at a second pressure and rate;

(i) second means for preventing said flowable plastic material from injecting through said first outlet while injecting said flowable plastic material through said second outlet; and (j) means for varying said first pressure and rate as said flowable plastic material is injected into said first mold cavity without varying said second pressure and rate.

11. The plastic injection molding apparatus of claim 10, wherein said first means for preventing said flowable plastic material from injecting through said second outlet is a central processing unit operably coupled to said second gate and wherein said second means for preventing said flowable plastic material from injecting through said first outlet is a central processing unit operably coupled to said first gate.

12. The plastic injection molding apparatus of claim 10, wherein said clamping means is a hydraulic cylinder.

13. The plastic injection molding apparatus of claim 10, wherein said first mold cavity is of a different dimension than said second mold cavity.

14. The plastic injection molding apparatus of claim 10, wherein said runner system also connects said inlet to a third outlet and further comprising a third gate connected to said runner system between said inlet and said third outlet.

15. The plastic injection molding apparatus of claim 14, wherein said second mold section is provided with a third recess in mating alignment with said third outlet, wherein a third mold cavity is formed when said second mold section is clamped into mating engagement with said first mold section, wherein said third gate is operably coupled to said runner system in a manner which allows said third gate to regulate the flow of said plastic material through said third outlet, and wherein said plastic injection molding apparatus further comprises third means for preventing said flowable plastic material from injecting through said third outlet until said first discreet mold cavity has been substantially filled and said second discreet mold cavity has been substantially filled.

\* \* \* \* \*